(12) United States Patent
Nakamura et al.

(10) Patent No.: US 7,286,334 B2
(45) Date of Patent: Oct. 23, 2007

(54) ELECTRIC DOUBLE LAYER CAPACITOR

(75) Inventors: Hitoshi Nakamura, Nagano (JP); Michio Okamura, Kanagawa (JP)

(73) Assignee: Power Systems Co., Ltd., Kanagawa (JP)

( * ) Notice: Subject to any disclaimer, the term of this patent is extended or adjusted under 35 U.S.C. 154(b) by 242 days.

(21) Appl. No.: 11/085,474

(22) Filed: Mar. 21, 2005

(65) Prior Publication Data
US 2005/0219797 A1    Oct. 6, 2005

(30) Foreign Application Priority Data
Mar. 30, 2004  (JP)  ............... 2004-099474

(51) Int. Cl.
    *H01G 9/00*  (2006.01)
(52) U.S. Cl. ............ 361/502; 361/503; 252/62.2
(58) Field of Classification Search ........... 361/502, 361/503; 252/62.2
    See application file for complete search history.

(56) References Cited

U.S. PATENT DOCUMENTS

| 2002/0039275 | A1 | 4/2002 | Takeuchi et al. | |
| 2003/0137798 | A1* | 7/2003 | Kawasato et al. | 361/505 |
| 2006/0171101 | A1* | 8/2006 | Kawasato et al. | 361/502 |

FOREIGN PATENT DOCUMENTS

| JP | 02-069916 | 3/1990 |
| JP | 11-317333 | 11/1999 |
| JP | 2000-077273 | 3/2000 |
| JP | 2002-025867 | 1/2002 |
| JP | 2003-171105 | 6/2003 |
| JP | 2004-087956 | 3/2004 |

OTHER PUBLICATIONS

Michio Okamura "Electric Double Layer Capacitors and Power Storage Systems" 2nd Edition, The Nikkan Kogyo Shimbun, Ltd., 2001, pp. 34 to 37.
Takeuchi Yasushi "Porous Materials: Characterization, Production and Application", Fujitec Corp., 1999, pp. 56 to 61.

* cited by examiner

*Primary Examiner*—Eric Thomas
(74) *Attorney, Agent, or Firm*—Harness, Dickey & Pierce, PLC

(57) ABSTRACT

The invention is intended to reduce expansion proportion of electric double layer capacitors by combining nonporous carbonaceous electrodes produced by a specific method with an electrolyte of a specific structure. Provided is an electric double layer capacitor comprising nonporous carbonaceous electrodes soaked in an organic electrolytic solution, wherein the organic electrolytic solution contains a pyrrolidinium compound salt as a solute, and wherein the carbonaceous electrodes are electrodes obtained by the method comprising a step of obtaining a carbon powder by prebaking a needle coke green powder under an inert atmosphere, baking the prebaked needle coke powder in the presence of alkali hydroxide under an inert atmosphere, and removing the alkali hydroxide; and a step of shaping the carbon powder.

19 Claims, 1 Drawing Sheet

ELECTRIC DOUBLE LAYER CAPACITOR

BACKGROUND OF THE INVENTION

1. Field of the Invention

The present invention relates to electric double layer capacitors comprising carbonaceous electrodes soaked in an organic electrolytic solution.

2. Description of the Related Art

Capacitors can repeat charge and discharge with a great amount of electric current and are hopeful for use as power storage devices accompanied with frequent charge and discharge. Capacitors, therefore, have been desired to be improved with respect to energy density, rapid charge-discharge characteristics, durability, etc.

The fact that carbonaceous electrodes are soaked in an organic electrolytic solution to form an electric double layer capacitor is known. Michio Okamura "Electric Double Layer Capacitors and Power Storage Systems" 2nd Edition, The Nikkan Kogyo Shimbun, Ltd., 2001, pages 34 to 37 discloses an electric double layer capacitor comprising a bath partitioned into two sections with a separator, an organic electrolytic solution filled in the bath and two carbonaceous electrodes, one electrode being soaked in one section of the bath and the other electrode being soaked in the other section of the bath. The organic electrolytic solution is a solution containing a solute dissolved in an organic solvent. The document discloses tetraethylammonium tetrafluoroborate ($Et_4NBF_4$) and the like as the solute and propylene carbonate as the solvent. As the carbonaceous electrodes, activated carbon is employed. The activated carbon refers to amorphous carbon which has a very large specific surface area because it has innumerable minute pores. In the present specification, amorphous carbon having a specific surface area not less than about 1000 $m^2/g$ is called activated carbon.

Japanese Patent Laid-open Publication No. H11(1999)-317333 discloses a nonporous carbonaceous material as carbonaceous electrodes for use in electric double layer capacitors. The carbonaceous material comprises fine crystalline carbon similar to graphite and has a specific surface area not larger than 300 $m^2/g$, which is smaller than that of activated carbon. Nonporous carbonaceous electrodes are considered to produce capacitance with the mechanism completely different from that of carbonaceous electrodes composed of activated carbon. It is believed that application of voltage makes electrolyte ions intercalate with solvent between layers of fine crystalline carbon similar to graphite, resulting in formation of an electric double layer.

Japanese Patent Laid-open Publication No. 2002-25867 discloses production of carbonaceous electrodes using needle coke or infusibilized pitch as a raw material. The needle coke refers to calcined coke with high graphitizability which has well-developed needle-form crystals. Needle coke possesses high electrical conductivity and extremely low proportion of thermal expansion. It also has high anisotropy based on its graphite crystal structure. Needle coke is generally produced by a delayed coking system using specially-treated coal tar pitch or petroleum heavy oil as a raw material.

Japanese Patent Laid-open Publication No. 2000-77273 discloses an electric double layer capacitor including nonporous carbonaceous electrodes soaked in an organic electrolytic solution. The organic electrolytic solution must have ion conductivity, and therefore the solute is a salt composed of a cation and an anion combined together. As the cation, lower aliphatic quaternary ammonium, lower aliphatic quaternary phosphonium, imidazolinium and the like are described. As the anion, tetrafluoroboric acid, hexafluorophosphoric acid and the like are described. The solvent of the organic electrolytic solution is a polar aprotic organic solvent. Specifically, ethylene carbonate, propylene carbonate, γ-butyrolactone, sulfolane and the like are disclosed.

The nonporous carbonaceous electrodes show electrostatic capacitance several times as much as those shown by porous electrodes made from activated carbon, and also has characteristics of expanding during electric field activation. When carbonaceous electrodes expand, the volume of the capacitor itself also increases. Thus, the increment of electrostatic capacitance per unit volume is lessened and it is impossible to increase the energy density of the capacitor sufficiently.

It is possible to reduce the expansion of the capacitor itself by mechanically pressing the carbonaceous electrodes beforehand. However, when the carbonaceous electrodes have high expansion proportion (empirically, an expansion proportion more than about 150%), great load is applied to a container of the capacitor. This causes difficulty in maintaining sealability of the container, and also reduction in its durability. Thus, the expansion proportion of nonporous carbonaceous electrodes during electric field activation has been required to be reduced as much as possible. Nonporous carbonaceous electrodes exhibit a great expansion particularly on the cathode side of a capacitor. The reduction of such expansion is effective for increase in energy density.

It is believed that the expansion of nonporous carbonaceous electrodes is caused by expansion of gaps of a layer structure of the electrodes, which gap expansion occurs when electrolyte ions intercalate between layers of fine crystalline carbon. It, therefore, is preferable that the diameter of electrolyte ions be small in order to reduce the expansion of nonporous carbonaceous electrodes. For this reason, electrolytes comprising ions having low molecular weight and simple structure have heretofore been used as solutes for organic electrolytic solutions of electric double layer capacitors.

SUMMARY OF THE INVENTION

The present invention intends to solve the existing problems. The object of the present invention is to reduce the expansion proportion of an electric double layer capacitor by combining nonporous carbonaceous electrodes produced by a specific method with an electrolyte of a specific structure.

The present invention provides an electric double layer capacitor comprising nonporous carbonaceous electrodes soaked in an organic electrolytic solution, wherein the organic electrolytic solution contains a pyrrolidinium compound salt as a solute, and wherein the carbonaceous electrodes are electrodes obtained by the method comprising a step of obtaining a carbon powder by prebaking a needle coke green powder under an inert atmosphere, baking the prebaked needle coke powder in the presence of alkali hydroxide under an inert atmosphere, and removing the alkali hydroxide; and a step of shaping the carbon powder.

The carbon powder is preferably obtained by baking a needle coke green powder under an inert atmosphere at 600 to 900° C. for 2 to 4 hours, mixing the baked powder with an alkali hydroxide powder in a weight ratio of 1.8 to 2.2 times the baked powder, baking the powder mixture under an inert atmosphere at 650 to 850° C. for 2 to 4 hours, washing the baked powder mixture to remove the alkali hydroxide and then drying the washed mixture.

The electric double layer capacitor of the present invention has reduced proportion of expansion at the time of electric field activation. As a result, it has high energy density and also is superior in durability.

DETAILED DESCRIPTION OF THE INVENTION

Figure 1:
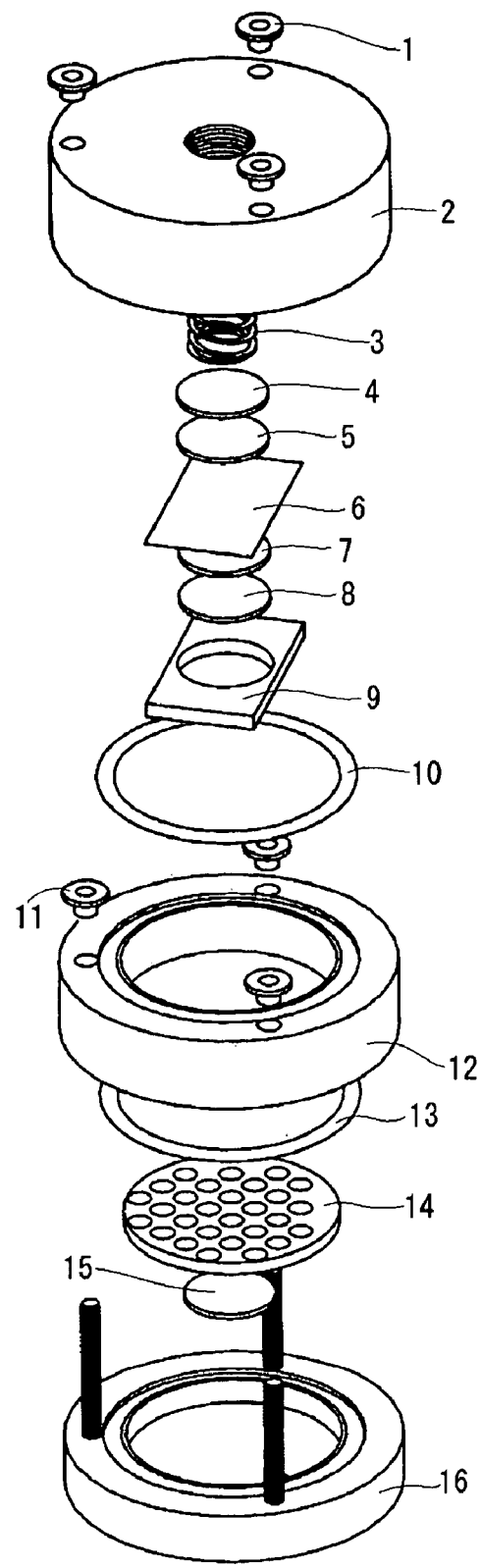
FIG. 1 is an assembling diagram showing the structure of the electric double layer capacitor of the Example. In the FIG., 1 or 11 is an insulation washer; 2 is a top cover; 3 is a spring; 4 or 8 is a current collector; 5 or 7 is a carbonaceous electrode; 6 is a separator; 9 is a guide; 10 or 13 is an o-ring; 12 is a body; 14 is a pressing plate; 15 is a reference electrode; and 16 is a bottom cover.

High temperature pyrolysis of petroleum heavy oil which is obtained during distillation of petroleum, provides a carbonaceous solid with needle-form structure. The solid right after its formation is called green (fresh) needle coke. When the solid is used for filler or the like, it is further calcined at a temperature of 1000° C. or higher. The solid after the calcination is called calcined needle coke, which is distinguished from green needle coke. In the present specification, powdery green needle coke is referred to as a needle coke green powder.

The nonporous carbonaceous electrodes of the present invention are produced using a needle coke green powder as a starting material. The needle coke green powder is easily crystallized even by baking conducted at relatively low temperatures. Accordingly, it is easy to control the ratio between its amorphous portion and its crystalline portion. An easily-graphitizable organic substance comes to have highly-oriented structure via heat treatment and is easily crystallized even by baking at relatively low temperatures. Accordingly, it is easy to control the ratio between its amorphous portion and its crystalline portion.

The needle coke green powder is generally produced using petroleum pitch as a raw material. In the present invention, however, it is permitted to use a coal-derived needle coke green powder resulting from carbonization using a refined material obtained by removal of quinoline insoluble matter from soft pitch contained in coal. Coal-derived needle coke generally has characteristics of having high true specific gravity, low proportion of thermal expansion and needle-form structure and being soft. In particular, coal-derived needle coke has characteristics of having larger grain size and lower proportion of thermal expansion in comparison to petroleum-derived needle coke. In addition, there is a difference in elemental composition. That is, the contents of sulfur and nitrogen of coal-derived needle coke are less than those of petroleum-derived needle coke (see, Takeuchi Yasushi "Porous Materials: Characterization, Production and Application", Fujitec Corp., 1999, pages 56 to 61).

For the production of the carbonaceous electrodes for use in the present invention, a needle coke green powder is prepared first. The central particle diameter of the raw material is 10 to 5000 μm, preferably 10 to 100 μm. Ash in the carbonaceous electrodes influences the formation of surface functional groups. It is important to reduce the ash content. The needle coke green powder for use in the present invention has a fixed carbon content of 70 to 98% and an ash content of 0.05 to 2%. Preferred is one having a fixed carbon content of 80 to 95% and an ash content of 1% or less.

A needle coke green powder is baked under the inert atmosphere, for example, under the atmosphere of nitrogen or argon at 500 to 900° C., preferably 600 to 800° C., more preferably 650 to 750° C. for 2 to 4 hours. It is believed that a crystal structure of a carbon structure is formed during this baking step.

If the baking temperature is lower than 500° C., micropores grow too much in the activation treatment. If over 900° C., activation does not proceed. The baking time has nothing to do with the reaction by nature. If, however, it is shorter than about two hours, heat is transferred not throughout the reaction system and, therefore, no uniform nonporous carbon is formed. There is no point in using a baking time longer than four hours.

The carbon powder baked is mixed with sodium hydroxide in an amount of 1.8 to 2.2 times, preferably about 2 times the powder, in weight ratio. The powder mixture is baked in the inert atmosphere at 650 to 850° C., preferably 700 to 750° C. for 2 to 4 hours. This step is called alkali activation and is considered to be effective in relaxing crystal structure of the carbon through impregnation of the carbon structure with vapor of alkali metal atoms.

If the amount of alkali hydroxide is less than 1.0 time, the activation does not proceed sufficiently and, therefore, capacitance at the time of initial charge is not obtained satisfactorily. If it is over 2.5 times, the activation proceeds excessively and the surface area tends to increase. As a result, the carbon will result in a surface condition similar to that of normal activated carbon and, therefore, it becomes difficult to take a voltage endurance. Although KOH, CsOH, RbOH and the like may be used as the alkali hydroxide, KOH is preferred because it has a superior activation effect and is inexpensive.

If the baking temperature is lower than 650° C., KOH does not permeate carbon deeply enough and the effect of relaxing carbon layers is reduced. As a result, the increase in capacitance at the time of initial charging does not readily occur. If the baking temperature is over 850° C., it is difficult to control the conditions of carbon because inconsistent actions, namely, the activation by KOH and the crystallization of the base carbon proceed simultaneously. If the material can be heated sufficiently, the baking time is not important by nature. If, however, the baking time is shorter than two hours, heat does not spread throughout the material enough and some sites will remain unactivated. There is no point in baking longer than four hours.

Subsequently, alkali hydroxide is removed from the resulting powder mixture by washing. The washing may be carried out, for example, by recovering particles from the carbon after the alkali treatment, filling it in a stainless column, introducing pressurized water steam at 120 to 150° C. and 10 to 100 kgf, preferably 10 to 50 kgf, into the column, and continuing to introduce the pressurized water steam until the pH of the drain becomes up to 7 (generally for 6 to 10 hours). After the completion of the alkali removal step, inert gas such as argon and nitrogen is made flow in the column to dry the carbon. Thus, a desired carbon powder is obtained.

The carbon powder obtained through the above-described steps has a specific surface area of 300 $m^2/g$ or less. This is categorized as so-called "nonporous carbon", which has few micropores as large as they can take various electrolyte ions, solvent, $CO_2$ gas and the like therein. The specific surface area can be determined by the BET method (110° C.) using $CO_2$ as an adsorbent.

The carbon powder prepared using a needle coke green powder as a raw material, however, is not just a "nonporous carbon," but has some micropores. That is, the carbon powder for use in the present invention has a volume of micropores with a diameter up to 0.8 nm of 0.01 to 0.1 ml/g, preferably 0.02 to 0.06 ml/g.

If the volume of the micropores with a diameter up to 0.8 nm in the carbon powder is less than 0.01 ml/g, the powder will be swollen at a large swelling ratio at the time of capacitor charging. On the other hand, if the volume is greater than 0.1 ml/g, the dielectric characteristics will deteriorate. Regarding the volume of micropores referred to herein, the volume of micropores with a diameter up to 0.8 nm can be determined by analyzing the micropore volume by the DFT method (Density Function Theory) based on a high resolution adsorption isotherm of carbon dioxide (273 K, $10^{-7}$ to 1 Torr) on the carbon in the material of the electrode. As a measuring device, an adsorption device for micropore measurements (Autosorb-1-MP (with a turbomolecular vacuum pump), manufactured by Quantachrome Instruments) may be used.

At present, no correlation has been found between the capacitance and the specific surface area of carbonaceous electrodes having high energy density. Elucidation of micropore structure is important for improvement in performance of carbon electrodes for electric double layers. Many of the conventional technologies use a surface area determined by the BET method as an index of micropore volume. The BET surface area, however, is estimated based on the hypothesis that a few molecules are adsorbed in layers on the surface of micropores having a diameter larger than 1 to 2 nm. The analysis of micropores with a diameter of 1 nm or less, which the present invention deals with, would not be achieved sufficiently by use of only the BET surface area.

Carbonaceous electrodes can be prepared by the methods similar to those conventionally used. For example, sheet-form electrodes are produced by pulverizing nonporous carbon prepared by the above-described method into a size of about 5 to 100 μm to regulate the particle size, subsequently adding an electrically-conductive aid, such as carbon black, for imparting electrical conductivity to the carbon powder and a binder, such as polytetrafluoroethylene (PTFE), kneading the mixture, and shaping the kneadate into sheet-form by rolling. In addition to carbon black, powdery graphite and the like may also be used as the electrically-conductive aid. PVDF, PE, PP and the like may also be used as the binder in addition to PTFE. The mixing ratio of the nonporous carbon, the electrically-conductive aid (carbon black) and the binder (PTFE) is generally about 10 to 1:0.5 to 10:0.5 to 0.25.

The thus-prepared carbonaceous electrodes for electric double layer capacitors may be used in electric double layer capacitors of structures conventionally known. Structures of electric double layer capacitors are shown, for example, in FIGS. 5 and 6 of Japanese Patent Laid-open Publication No. H11(1999)-317333, FIG. 6 of Japanese Patent Laid-open Publication No. 2002-25867 and FIGS. 1 to 4 of Japanese Patent Laid-open Publication No. 2000-77273. In general, such an electric double layer capacitor can be assembled by superposing sheet-form carbon electrodes via a separator to form positive and negative electrodes, and then impregnating the electrodes with an electrolytic solution.

The electrolytic solution is obtained, for example, by dissolving an electrolyte as a solute in an organic solvent. As the electrolyte, pyrrolidinium compound salts are employed. Preferable pyrrolidinium compound salts have a structure represented by the following formula:

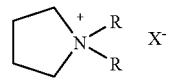

wherein R independently represents an alkyl group or Rs form together an alkylene group, and $X^-$ represents a counter anion. Pyrrolidinium compound salts are conventionally known. Any one prepared by a method which a person skilled in the art knows may be employed.

The ammonium component of the pyrrolidinium compound salt is preferably one represented by the above formula wherein the R independently represents an alkyl group having 1 to 10 carbon atoms or the Rs form together an alkylene group having 3 to 8 carbon atoms. Ones in which the Rs form together an alkylene group having 4 or 5 carbon atoms and derivatives thereof are more preferable. Ones in which the Rs form together a butylene group and derivatives thereof are even more preferable. The ammonium component is called spirobipyrrolidinium (SBP).

Pyrrolidinium compounds, in particular, spirobipyrrolidinium evidently have complex structures and seem to have large ion diameters. However, use of such compounds as an electrolyte ion of an organic electrolytic solution provides significant effect of inhibiting expansion of the nonporous carbonaceous electrode of the cathode side and, as a result, energy density of the electric double layer capacitors greatly increases. Although not intending to limit theoretically, it is believed that the spread of electron clouds is controlled by a spiro ring structure and, therefore, pyrrolidinium compounds and spirobipyrrolidinium compounds may have small effective ion diameters.

The counter anion $X^-$ may be any one which has heretofore been used as an electrolyte ion of an organic electrolytic solution. Examples include a tetrafluoroborate anion, a fluoroborate anion, a borate anion partly substituted with a borofluoroalkyl group, a fluorophosphate anion, a hexafluorophosphate anion, a perchlorate anion, a borodisalicylate anion, a borodioxalate anion, an iodate ainon and the like. Preferable counter anions are a tetrafluoroborate anion and a hexafluorophosphate anion because these have low molecular weights and have simple structures and therefore expansion of the nonporous carbonaceous electrode of the anode ??? side can be controlled.

When the pyrrolidinium compound salt is dissolved in an organic solvent as a solute, an organic electrolytic solution for electric double layer capacitors is obtained. The concentration of the pyrrolidinium compound salt in an organic electrolyte solution is adjusted to 0.8 to 3.5% by mol, preferably 1.0 to 2.5% by mol. If the concentration of the pyrrolidinium compound salt is less than 0.8% by mol, the number of ions contained is not sufficient and enough capacitance is not produced. A concentration over 2.5% by mol is meaningless because it does not contribute to capacitance.

Pyrrolidinium compound salts may be used alone or as mixtures of two or more kinds of them. Such salts may be used together with electrolytes conventionally employed for organic electrolytic solutions. The content of the pyrrolidinium compound salts in the whole solute is set to 50% by weight or more, preferably 75% by weight or more of the weight of the whole solute. Examples of electrolytes suitable for use in combination with pyrrolidinium compound salts include triethylmethylammonium and tetraethylammonium.

As the organic solvent, ones which have heretofore been used for organic electric double layer capacitors may be used. For example, ethylene carbonate (EC), propylene carbonate (PC), γ-butyrolactone (GBL) and sulfolane (SL) are preferable because of their high dissolvability of pyrrolidinium compound salts and their high safety. Solvents containing these as main solvent and at least one selected from dimethyl carbonate (DMC), ethylmethyl carbonate (EMC) and diethyl carbonate (DEC) as auxiliary solvent are also useful because the low-temperature characteristics of electric double layer capacitors are improved. Use of acetonitrile (AC) as the organic solvent is preferable from the viewpoint of performances because it improves conductivity of electrolytic solutions. However, in some cases, the applications are restricted.

When nonporous carbonaceous electrodes obtained by using needle coke as a raw material and an electrolytic solution containing pyrrolidinium compound salts are used in combination, an effect of inhibiting expansion of cathodes is remarkably exhibited and energy density. of electric double layer capacitors greatly increases.

The present invention will be described in more detail below with reference to Examples, but the invention is not limited thereto. Note that the amounts expressed in "part(s)" or "%" in the Examples are by weight unless otherwise stated.

EXAMPLE 1

Potassium hydroxide pellets were ground into a powder using a mill. A coal-derived needle coke green powder (NCGP) manufactured by The Japan Steel Works, Ltd. was baked in alumina crucibles under nitrogen flow in a muffle furnace at temperatures given in Table 1 for three hours and then naturally cooled. The baked powders were each mixed with a potassium hydroxide powder of an amount of 1.5 times by weight the baked powder. These mixtures were each placed in nickel crucibles, which were then covered with nickel lids so that the external air was interrupted. These samples were activated in a muffle furnace under nitrogen flow at 750° C. for a retention time of four hours. The final baked samples were taken out, washed lightly with pure water and then subjected to ultrasonic cleaning for one minute. Then, water was removed using a Buchner funnel. The same cleaning operations were repeated until washings came to have a pH of about 7, The resulting samples were dried at 200° C. for 10 hours in a vacuum dryer.

Each of the resulting carbons were ground with 10-mmφ alumina balls in a ball mill (AV-1 manufactured by Fujiwara Scientific Company) for one hour. These were measured for their particle size using a Coulter counter and were found to be a powder with a central particle diameter about 10 micrometers. The specific surface area of each of the resulting powdery carbons was measured by the BET method to be 80 m$^2$/g. The volume of micropores having a diameter equal to or smaller than 0.8 nm was 0.04 ml/g.

A powdery carbon (CB) was mixed with acetylene black (AB) and a polytetrafluoroethylene powder (PTFE) so that the mixing ratio became 10:1:1, and then the mixture was kneaded in a mortar. In about 10 minutes, the PTFE was extended to form flakes. The flake was pressed with a press machine, yielding a carbon sheet of 200 microns thick.

This carbon sheet was stamped into 20-mmφ disks, which were fabricated into a three-electrode cell shown in FIG. 1. As the reference electrode, activated carbon #1711 processed into a sheet by a method similar to that described above was used. Each of the cells prepared in the same manner was dried in vacuo at 220° C. for 24 hours and cooled. An electrolytic solution was prepared by dissolving spirobipyrrolidinium tetrafluoroborate (SBPBF$_4$) in propylene carbonate so that the concentration of the solute became 2.0% by mol. The resulting electrolytic solution was poured into the cells. Thus, electric double layer capacitors were prepared.

To each of the electric double layer capacitors, a charge-discharge tester CDT-RD20 manufactured by Power Systems Co., Ltd. was connected and then a constant current charge at 5 mA was carried out for 7200 seconds. After the arrival at a programmed voltage, a constant current discharge was carried out at 5 mA. The charge and discharge cycle was repeated three times at programmed voltages of 4.0V and 3.5V each. Capacitance of each cell was calculated from the discharged power. The cell of the capacitor the measurement of which had been finished was disassembled and thickness of the electrodes was measured. The results are shown in Table 1.

COMPARATIVE EXAMPLE 1

Electric double layer capacitors were prepared and tested in the same manner as Example 1 except that 1.8% by mol of triethylmethylammonium tetrafluoroborate (TEMABF$_4$) was used instead of spirobipyrrolidinium tetrafluoroborate. The results are shown in Table 1.

TABLE 1

| | Prebaking temperature (° C.) | Thickness after activation (thickness of single electrode/μm) | Expansion proportion (times) | Capacitance (F) | Capacitance density (F/cc) |
|---|---|---|---|---|---|
| Example 1 Solute: SBPBF$_4$ | 500 | 212 | 1.06 | 6.37 | 24.00 |
| | 600 | 242 | 1.21 | 8.68 | 28.57 |
| | 700 | 292 | 1.46 | 10.81 | 29.55 |
| | 800 | 340 | 1.70 | 11.87 | 27.85 |
| | 900 | 386 | 1.93 | 1.44 | 2.96 |
| | 1000 | 292 | 1.46 | 0.03 | 0.08 |
| Comparative Example 1 Solute: | 500 | 246 | 1.32 | 5.69 | 17.14 |
| | 600 | 302 | 1.51 | 7.75 | 20.41 |
| | 700 | 364 | 1.82 | 9.66 | 21.11 |

TABLE 1-continued

|  | Prebaking temperature (° C.) | Thickness after activation (thickness of single electrode/μm) | Expansion proportion (times) | Capacitance (F) | Capacitance density (F/cc) |
|---|---|---|---|---|---|
| TEMABF$_4$ | 800 | 424 | 2.12 | 10.60 | 19.89 |
|  | 900 | 482 | 2.41 | 1.28 | 2.12 |
|  | 1000 | 366 | 1.83 | 0.03 | 0.05 |

COMPARATIVE EXAMPLE 2

A green powder of mesophase pitch (HCMB) manufactured by Osaka Gas Co., Ltd. was baked in alumina crucibles under nitrogen flow in a muffle furnaced at temperatures given in Table 2 for three hours and then naturally cooled. The baked powders were each mixed with a potassium hydroxide powder of an amount of 1.5 times by weight the baked powder. These mixture were each placed in nickel crucibles, which were then covered with nickel lids so that the external air was interrupted. These samples were activated in a muffle furnace under nitrogen flow at 750° C. for a retention time of four hours. The final baked samples were taken out, washed lightly with pure water and then subjected to ultrasonic cleaning for one minute. Then, water was removed using a Buchner funnel. The same cleaning operations were repeated until washings came to have a pH of about 7. The resulting samples were dried at 200° C. for 10 hours in a vacuum dryer.

A carbon sheet was prepared in the same manner as Example 1 except using the carbon obtained above. The specific surface area of this carbon was measured by the BET method to be 122 m$^2$/g.

This carbon sheet was stamped into 20-mmφ disks, which were fabricated into a three-electrode cell shown in FIG. 1. As the reference electrode, activated carbon #1711 processed into a sheet by a method similar to that described above was used. Each of the cells prepared in the same manner was dried in vacuo at 220° C. for 24 hours. An electrolytic solution was prepared by dissolving triethylmethylammonium tetrafluoroborate (TEMABF$_4$) in propylene carbonate so that the concentration of the solute became 1.8 M/kg. The resulting electrolytic solution was poured into the cells. Thus, electric double layer capacitors were prepared.

The resulting electric double layer capacitors were examined in the same manner as Example 1. The results are shown in Table 2.

COMPARATIVE EXAMPLE 3

One part of formalin was mixed with one part of phenol. To the mixture, 1% of potassium hydroxide was added as a catalyst. The resulting mixture was introduced into a sealed glass vessel, which was then placed in a thermostatic oven of 50° C. Thus, the mixture was allowed to react. Ten hours later, when the vessel was taken out, the mixture resinified to form bakelite. The vessel was uncovered and excess formalin and phenol were vaporized off at 200° C. The residue was ground into a powder using a mill. Thus, a powder of pure bakelite powder was obtained. This powder was baked in alumina crucibles under nitrogen flow in a muffle furnace at temperatures given in Table 3 for three hours and then naturally cooled. The baked powders were each mixed with a potassium hydroxide powder of an amount of 1.5 times by weight the baked powder. These mixtures were each placed in nickel crucibles, which were then covered with nickel lids so that the external air was interrupted. These samples were activated in a muffle furnace under nitrogen flow at 750° C. for a retention time of four hours. The final baked samples were taken out, washed lightly with pure water and then subjected to ultrasonic cleaning for one minute. Then, water was removed using a Buchner funnel. The same cleaning operations were repeated until washings came to have a pH of about 7. The resulting samples were dried at 200° C. for 10 hours in a vacuum dryer.

A carbon sheet was prepared in the same manner as Example 1 except that the carbon obtained above was used. The specific surface area of this carbon was measured by the BET method to be 120 m$^2$/g.

This carbon sheet was stamped into 20-mmφ disks, which were fabricated into a three-electrode cell shown in FIG. 1. As the reference electrode, activated carbon #1711 processed into a sheet by a method similar to that described above was used. Each of the cells prepared in the same

TABLE 2

|  | Prebaking temperature (° C.) | Thickness after activation (thickness of single electrode/μm) | Expansion proportion (times) | Capacitance (F) | Capacitance density (F/cc) |
|---|---|---|---|---|---|
| Comparative Example 2 | 500 | 582 | 2.91 | 5.56 | 7.60 |
|  | 600 | 644 | 3.22 | 5.89 | 7.28 |
| Solute: | 700 | 706 | 3.53 | 8.50 | 9.58 |
| TEMABF$_4$ | 800 | 762 | 3.81 | 9.78 | 10.22 |
|  | 900 | 784 | 3.92 | 9.33 | 9.47 |
|  | 1000 | 830 | 4.15 | 0.03 | 0.03 | manner was dried in vacuo at 220° C. for 24 hours and cooled. An electrolytic solution was prepared by dissolving triethylmethylammonium tetrafluoroborate (TEMABF$_4$) in propylene carbonate so that the concentration of the solute became 1.8 M/kg. The resulting electrolytic solution was poured into the cells. Thus, electric double layer capacitors were prepared.

The resulting electric double layer capacitors were examined in the same manner as Example 1. The results are shown in Table 3.

TABLE 3

| | Prebaking temperature (° C.) | Thickness after activation (thickness of single electrode/μm) | Expansion proportion (times) | Capacitance (F) | Capacitance density (F/cc) |
|---|---|---|---|---|---|
| Comparative Example 3 Solute: TEMABF$_4$ | 500 | 566 | 2.83 | 5.73 | 8.06 |
| | 600 | 670 | 3.35 | 6.16 | 7.32 |
| | 700 | 696 | 3.48 | 8.68 | 9.93 |
| | 800 | 752 | 3.76 | 9.28 | 9.82 |
| | 900 | 782 | 3.91 | 9.08 | 9.24 |
| | 1000 | 746 | 3.73 | 0.03 | 0.03 |

As shown by the results indicated as expansion proportion and capacitance density in Tables 1 to 3, expansion of the nonporous carbonaceous electrodes during the electric field activation was controlled and energy density of the electric double layer capacitors are improved in the Example using the needle coke as a raw material of the carbonaceous electrodes and also using the pyrrolidinium compound salt as the solute of an organic electrolytic solution.

What is claimed is:

1. An electric double layer capacitor comprising nonporous carbonaceous electrodes soaked in an organic electrolytic solution,
   wherein the organic electrolytic solution contains a pyrrolidinium compound salt as a solute, and
   wherein the carbonaceous electrodes are electrodes obtained by the method comprising:
   a step of obtaining a carbon powder by prebaking a needle coke green powder under an inert atmosphere, baking the prebaked needle coke powder in the presence of alkali hydroxide under an inert atmosphere, and removing the alkali hydroxide; and
   a step of shaping the carbon powder.

2. The electric double layer capacitor according to claim 1, wherein the carbon powder is obtained by baking the needle coke green powder under an inert atmosphere at 600 to 900° C. for 2 to 4 hours, mixing the baked powder with an alkali hydroxide powder in a weight ratio of 1.8 to 2.2 times the baked powder, baking the powder mixture under the inert atmosphere at 650 to 850° C. for 2 to 4 hours, washing the baked powder mixture to remove the alkali hydroxide and then drying the washed mixture.

3. The electric double layer capacitor according to claim 1, wherein the needle coke green powder is a coal-derived needle coke green powder.

4. The electric double layer capacitor according to claim 1, wherein the carbon powder derived from the needle coke green powder has a specific surface area of not more than 300 m$^2$/g.

5. The electric double layer capacitor according to claim 4, wherein the carbon powder derived from the needle coke green powder has a volume of micropores with a diameter up to 0.8 nm of 0.01 to 0.1 ml/g.

6. The electric double layer capacitor according to claim 1, wherein the pyrrolidinium compound salt is represented by the formula:

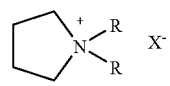

wherein R independently represents an alkyl group having 1 to 10 carbon atoms, or Rs form together an alkylene group having 3 to 8 carbon atoms, and X$^-$ represents a counter anion.

7. The electric double layer capacitor according to claim 6, wherein the Rs form together an alkylene group having 3 to 8 carbon atoms.

8. The electric double layer capacitor according to claim 6, wherein the Rs form together an alkylene group having 4 or 5 carbon atoms.

9. The electric double layer capacitor according to claim 6, wherein the counter anion of the pyrrolidinium compound salt is a tetrafluoroborate anion, a borate anion partly substituted with a borofluoroalkyl group, a hexafluorophosphate anion, a perchlorate anion or an iodate anion.

10. The electric double layer capacitor according to claim 1, wherein the pyrrolidinium compound salt is a spirobipyrrolidinium salt.

11. An organic electrolytic solution for the electric double layer capacitor of claim 1, which contains a pyrrolidinium compound salt as a solute, wherein the pyrrolidinium compound salt is represented by the formula:

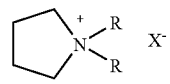

wherein R independently represents an alkyl group having 1 to 10 carbon atoms, or Rs form together an alkylene group having 3 to 8 carbon atoms, and X$^-$ represents a counter anion.

12. The organic electrolytic solution according to claim 11, wherein the Rs form together an alkylene group having 3 to 8 carbon atoms.

13. The organic electrolytic solution according to claim 11, wherein the Rs form together an alkylene group having 4 or 5 carbon atoms.

14. The organic electrolytic solution according to claim 11, wherein the counter anion of the pyrrolidinium compound salt is a tetrafluoroborate anion, a borate anion partly substituted with a borofluoroalkyl group, a hexafluorophosphate anion, a perchlorate anion or an iodate anion.

15. A carbonaceous electrode for the electric double layer capacitor obtained by the method comprising:
a step of obtaining a carbon powder by prebaking a needle coke green powder under an inert atmosphere, baking the prebaked needle coke powder in the presence of alkali hydroxide under an inert atmosphere, and removing the alkali hydroxide; and
a step of shaping the carbon powder.

16. The carbonaceous electrode according to claim 15, wherein the carbon powder is obtained by baking the needle coke green powder under an inert atmosphere at 600 to 900° C. for 2 to 4 hours, mixing the baked powder with an alkali hydroxide powder in a weight ratio of 1.8 to 2.2 times the baked powder, baking the powder mixture under the inert atmosphere at 650 to 850° C. for 2 to 4 hours, washing the baked powder mixture to remove the alkali hydroxide and then drying the washed mixture.

17. The carbonaceous electrode according to claim 15, wherein the needle coke green powder is a coal-derived needle coke green powder.

18. The carbonaceous electrode according to claim 15, wherein the carbon powder derived from the needle coke green powder has a specific surface area of not more than 300 $m^2/g$.

19. The carbonaceous electrode according to claim 18, wherein the carbon powder derived from the needle coke green powder has a volume of micropores with a diameter up to 0.8 nm of 0.01 to 0.1 ml/g.

* * * * *